Jan. 16, 1923.

R. CRATTY.
ANIMAL TRAP.
FILED MAR. 10, 1922.

Inventor
R. Cratty.
By [signature]
Attorney

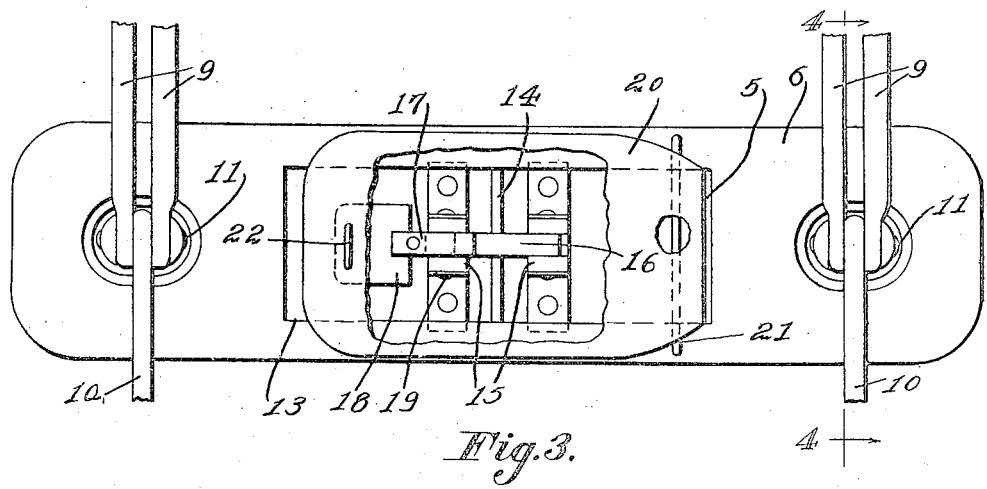
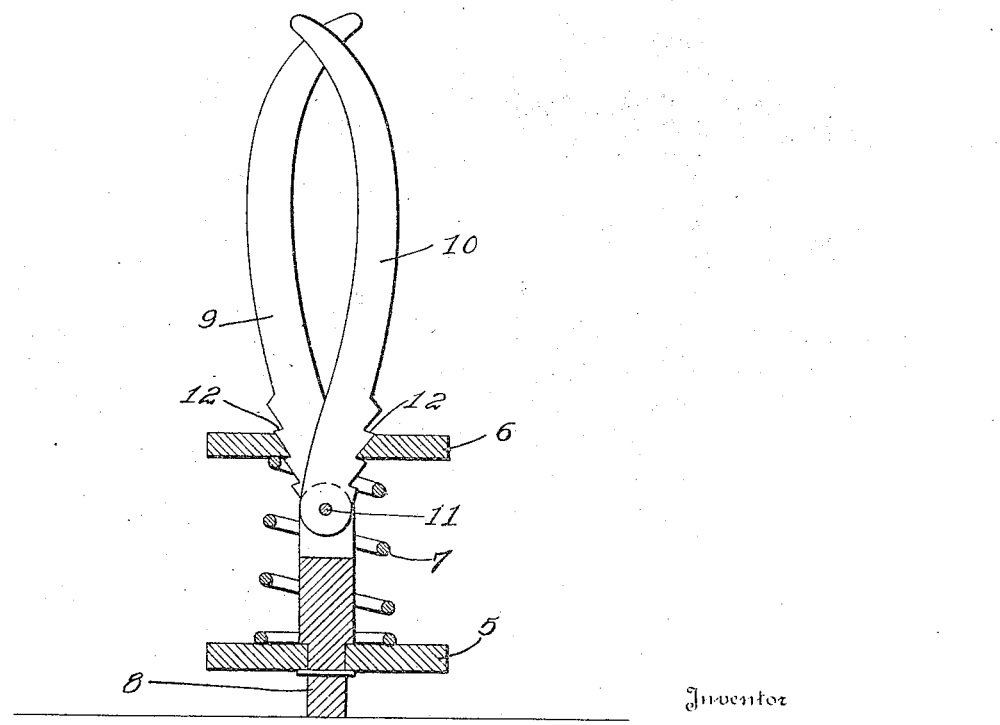

Patented Jan. 16, 1923.

1,442,385

UNITED STATES PATENT OFFICE.

ROBERT CRATTY, OF SEATTLE, WASHINGTON, ASSIGNOR OF ONE-HALF TO THOMAS HUNTLEY, OF SEATTLE, WASHINGTON.

ANIMAL TRAP.

Application filed March 10, 1922. Serial No. 542,735.

*To all whom it may concern:*

Be it known that I, ROBERT CRATTY, a citizen of the United States, residing at Seattle, in the county of King and State of Washington, have invented a new and useful Animal Trap, of which the following is a specification.

By way of illustration, it might be stated that animals when caught in traps that engage the feet or legs thereof, often release themselves by gnawing off the foot or leg part, caught in the trap.

It is therefore the object of the present invention to provide a trap which will engage and hold an animal by contact with the body of the animal, thereby insuring against the animal releasing himself, in a manner as stated.

Another object of the invention is to provide pivoted jaw sections curved throughout their lengths to conform to the curvature of the body of an animal, so that when the jaws move into engagement with the body of an animal, the animal will be tightly gripped and held to the trap.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 3 is a plan view of the trap, a portion of the treadle being broken away to illustrate the treadle securing arms.

Figure 4 is a sectional view taken on line 4—4 of Figure 3.

Figure 1:
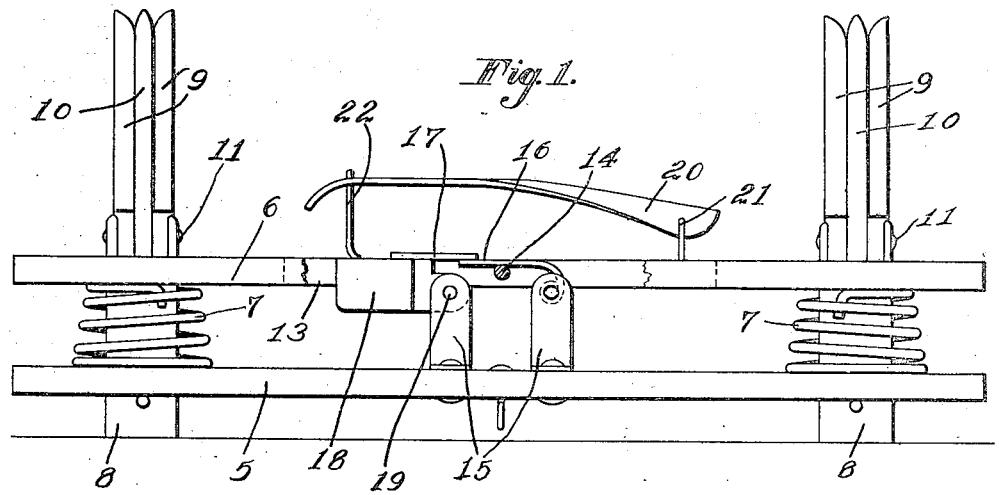
Figure 1 is a side elevational view of a trap constructed in accordance with the present invention, and disclosing the jaws in unset positions.
Figure 2:
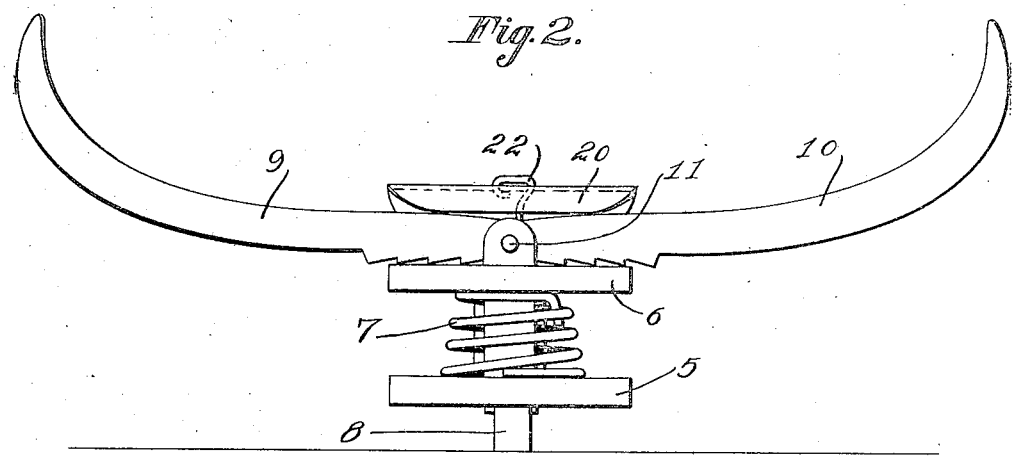
Figure 2 is an end elevational view of the trap, showing the jaws in a set position.

Referring to the drawings in detail, the trap embodies a stationary section 5, and an upper movable section 6, the upper section being normally held away from the stationary section, as by means of the coiled springs 7 disposed at opposite ends of the section.

Vertical bars 8 are secured to the lower section 5 at points adjacent to the lower end thereof, and are shown as extending upwardly through openings in the upper section 6, the upper ends of the bars 8 terminating at points in spaced relation with the upper surface of the section 6, where the same are bifurcated to provide supports for the pivoted jaws 9 and 10 respectively. These jaws are secured to the bars 8 as by means of the pins 11 which extend through the furcations of the bars 8 and through suitable openings provided in the jaws 9 and 10.

The openings, which are formed adjacent to the ends of the upper section 6 and through which the bars 8 extend, have their walls inclined as clearly shown by Figure 4 of the drawings, the walls being of constructions to engage the offset portions or shoulders 12 formed adjacent to the lower end of the jaws 9 and 10. From the foregoing it will be seen that when the jaws 9 and 10 are moved to closed positions as shown by Figure 4 of the drawings, the jaws are held in such positions and may only be released by moving the jaws inwardly to disengage the shoulders 12 and section 6.

The upper section 6 is formed with a central cut out portion 13, the rod 14 being shown as connecting the side walls of the cut out portion to provide a guard bar for the latch mechanism controlled by the treadle. The latch mechanism embodies a pair of upwardly extending arms 15 which are disposed in spaced relation with each other, one of the arms 15 providing a support for the lever 16 which overlies the rod 14 and engages the plate 17 carried by the block 18 which in turn is pivotally connected with the opposite arm 15 as at 19.

The treadle embodies a relatively large plate indicated at 20 which is of a size to cover the cut out portion 13 to hide the latch mechanism from view. This treadle 20 is pivotally connected to the upper section 6 as at 21, the free end of the treadle carrying the rod 22 adapted to rest on the block 18 when the trap is in a set position.

In the operation of the device, the treadle and latch mechanism together with the jaws 9 and 10 are moved to positions as shown by Figure 1 of the drawings, whereupon an animal passing through the jaws will contact with the treadle or plate 20 forcing the same downwardly. It follows that the block 18 pivots downwardly disengaging the members 16 and 17, whereupon the spring members 7 which are under compression, force the upper section 6 upwardly over the jaws, which movement moves the jaws into gripping relation with each other to grip the animal.

It might be further stated that suitable anchoring means should be provided in connection with the trap to eliminate any possibility of the animal moving the trap.

Having thus described the invention, what is claimed as new is:—

A trap embodying a lower section, and a vertically movable upper section, said upper section having openings formed adjacent to the ends thereof, bars carried by the lower section and extending through the sections, means for normally urging the upper section upwardly, swinging jaws supported by the bars, means carried by the jaws and adapted to engage the walls of the openings of the upper section to prevent downward movement of the upper section, and means embodying a treadle for normally holding the trap in a set position.

In testimony that I claim the foregoing as my own, I have hereto affixed my signature in the presence of two witnesses.

ROBERT CRATTY.

Witnesses:
OTTO R. FRIESKE,
EDWARD KALLINS.